400-77 EX Examiner
OR RE 20,358
May 11, 1937. C. A. MACOMIC Re. 20,358
Orig. 1,916,272
CARRIAGE DRIVE MECHANISM
Original Filed Dec. 15, 1928 2 Sheets-Sheet 1
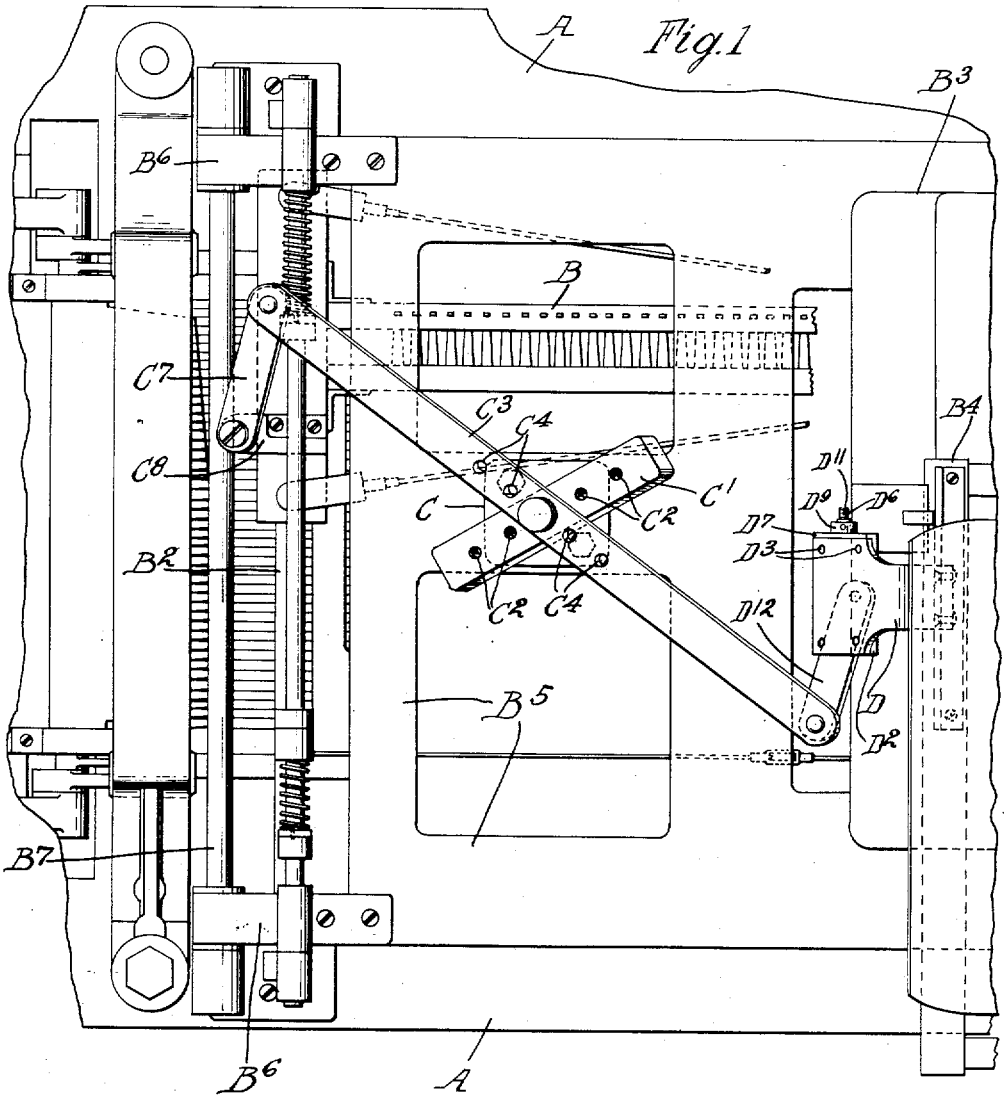
Inventor
Chester A. Macomic
by Parker & Carter
Attorneys.

197 TYPEWRITING MACHINES
1
Examiner
May 11, 1937. C. A. MACOMIC Re. 20,358
CARRIAGE DRIVE MECHANISM
Original Filed Dec. 15, 1928 2 Sheets-Sheet 2
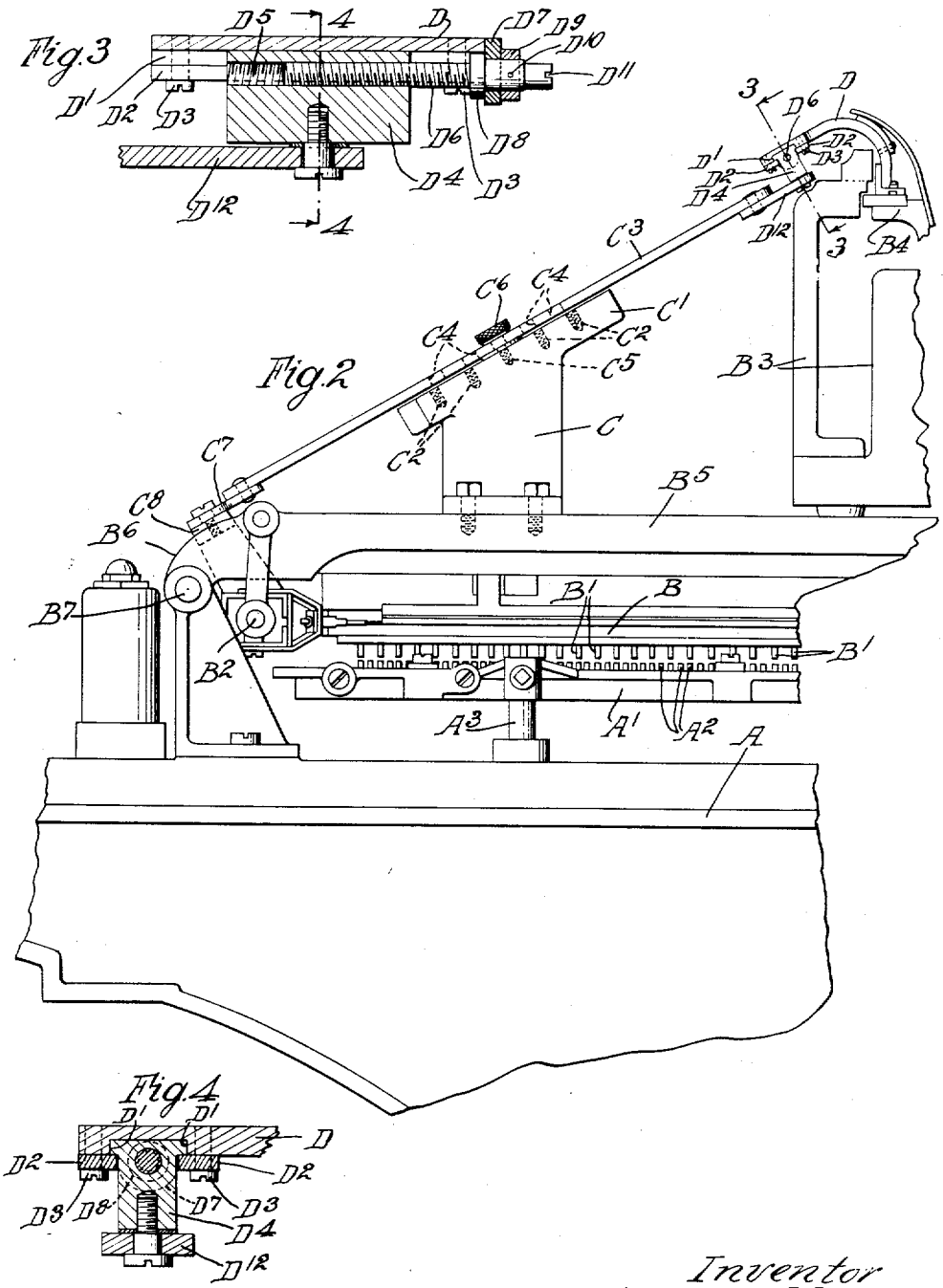
Inventor
Chester A. Macomic
by Parker & Carter
Attorneys.

7 TYPEWRITING MACHINES

Examiner

Reissued May 11, 1937

Re. 20,358

UNITED STATES PATENT OFFICE 20,358

CARRIAGE DRIVE MECHANISM

Chester A. Macomic, Chicago, Ill., assignor to Macomic Corporation, a corporation of Delaware Original No. 1,916,272, dated July 4, 1933, Serial No. 326,180, December 15, 1928. Application for reissue July 2, 1935, Serial No. 29,547

11 Claims. (Cl. 197—1)

My invention relates to improvements in carriage drive mechanism for line casting machines, printing machines and the like and has for one object to provide a connection whereby one movable carriage or element may be propelled in response to and in unison with the movement of another and whereby the two carriages or moving elements may be given a selective differentiated movement. Another object is to provide an apparatus whereby the relative positions of the carriages or movable elements may be adjusted.

My invention is primarily applicable to a type casting or printing machine wherein a typewriter is used as the operating or controlling mechanism and wherein the movement of the typewriter carriage is relied upon to move a second so-called plunger carriage whereby separate lines of pattern setting mechanisms may be controlled by the manipulation of the typewriter. For this purpose, it is necessary to have a driving connection which will permit the typewriter carriage movement to displace the plunger carriage in the present instance in the opposite direction from the movement of the typewriter carriage and if necessary through a different increment of travel for each step of the typewriter carriage because under some conditions it may be necessary to use the typewriter, the space between whose letters is fixed to set type or to select matrices for casting type of different widths than those written by the typewriter. Other objects will appear from time to time in the specification and claims.

My invention is illustrated more or less diagrammatically in the accompanying drawings, wherein—

Figure 1 is a plan view of so much of a type casting machine as is necessary to illustrate my invention;

Figure 2 is a side elevation of the device shown in Figure 1;

Figure 3 is a section along the line 3—3 of Figure 2;

Figure 4 is a section along the line 4—4 of Figure 3.

Like parts are indicated by like characters throughout.

A is a supporting frame for a type casting machine. A1 is a pattern bed. It has a plurality of pattern pins A2 projecting upwardly therefrom, is mounted on supporting plungers A3 and may be moved toward and from the bed A, the idea being that this pattern bed has a series of rows of pins, there being one row for each stop in the typewriter carriage and the pins in each row represent all the characters in the font of type of the typewriter. Any one of these pins in a row being depressed will serve as a stop or selecting means to stop a matrix strip or a printing bar and thereby select it for use in connection with printing or typecasting.

B is a plunger carriage. It has a row of plungers B1 extending longitudinally. The carriage itself is movable laterally along the guide bar B2 so that the carriage may be brought successively into cooperation with individual lines of pattern or stop pins. Means are provided not here shown as they form no part of the present invention, to manipulate the various plungers in the plunger carriage to cause them to depress selected pattern pins.

B3 is a typewriter having a carriage B4 and it is desired to connect the carriage B4 of the typewriter and the plunger carriage B so as to cause them to operate together. The typewriter stands upon a frame B5 which overlies the pattern bed and the plunger carriage and is for the purposes of convenience in assembly and inspection provided with hinges B6 pivoted on a hinge bar B7, the space between the hinges, the hinge bar and the body of the frame being open to permit the connecting mechanism to extend therethrough.

Projecting upwardly from the frame B5 intermediate the typewriter and the back of the frame is a bracket C. This bracket terminates in an inclined arm C1. It will be noted that this arm is inclined to the horizontal and also diagonal with respect to the travel of the two carriages as indicated especially in Figure 1. This inclined arm or fulcrum pad and support C1 has a plurality of threaded holes C2 extending along the axis thereof. C3 is a lever having a plurality of holes C4 spaced along the axis thereof. The threaded pin C5 with knurled head C6 may be inserted selectively through any one of the holes C4 in the lever and screwed into any one of the holes C2 in the arm C1 so as to change not merely the position of the fulcrum of the lever but the distance between the two ends of the lever and the fulcrum. C7 is a link pivoted at one end on the lever and at the other end on the arm C8 projecting upwardly from the plunger carriage B thus giving a relatively permanent connection between the plunger carriage and one end of the lever, though by means of the linkage obviously wide variation in operation is permitted.

Projecting from the typewriter carriage B4 is a bracket D. This bracket is slotted longitudinally on its underside parallel with the movement of the typewriter carriage as indicated at D1. The opposed sides of this slot are overlain by removable guide plates D2 held in place by screws D3 and the adjustable pivot block D4 is flanged to engage the slot D1 and to be held in position by the guide plates D2. This pivot block is perforated and interiorly threaded as at D5. D6 is a lead screw rotatably mounted in the plate D7 on the end of the bracket D held against longitudinal movement by means of an integral flange D8 on one side of the plate D7 and a ring D9 held in position by a pin D10 on the other side. The end of the screw projecting beyond the ring D9 is slotted as at D11 so that it may be manipulated by a screw driver or other suitable means to move the pivot block D4 longitudinally with respect to the travel of the typewriter carriage. D12 is a link pivoted at one end on the lever C3 and at the other end of the block D4, the links D12 and C7 being as shown of equal length.

It will be evident that while I have shown in my drawings an operative device, still many changes might be made in the size, shape, number, arrangement and disposition of parts without departing materially from the spirit of my invention and I wish, therefore, that my showing be taken as in a sense diagrammatic and that this adjustable lever connection may be used, while shown primarily as applied to a type casting machine operated by a typewriter carriage, equally well in connection with any apparatus or any mechanism where one moving member drives or controls another moving member and wherein it is desired to give different rates of travel to the two members.

The use and operation of my invention are as follows:

The typewriter is operated in the usual manner and the typewriter carriage travels back and forth subject to the ordinary typewriter operation. Since the connecting lever is on a fixed pivot and since there is a link between each end of the connecting lever and the typewriter carriage and the plunger carriage respectively, every movement of the typewriter carriage will be imparted to the plunger carriage. In the arrangement shown, since the pivot for the lever is intermediate its two ends, the movement of the two carriages will be in the opposite direction. If the fulcrum of the lever is equidistant between the points at which power is applied to the two moving members and if the two arms of the lever are the same, then movement of the two carriages or two moving members will be the same but in opposite directions because the angularity of the lever with respect to both of them and the angularity of each link at each end will be the same. I illustrate the typewriter carriage B4 which is rectilinearly movable along the usual guiding tracks common to typewriters, not indicated in detail herein. I also illustrate a plunger carriage B which is movable along the guide bar B2. It will be understood that the track means for guiding the said two carriages are parallel and that the two carriages move along parallel paths, although in opposite directions.

If it is desired to impart a different motion to the two moving members, this may be accomplished either by changing both the position of the lever fulcrum and the length of the lever arms by pivoting the lever to its fulcrum pad at different selected points or by separately changing the pivot with respect to the lever alone or with respect to the pad alone or by making any desired combination of said adjustments. This requires certain longitudinal displacement of the lever which is compensated for by the link connection between the two ends of the lever and the moving members and may in order to zero the two moving members also require manipulation of the position of the pivot point of the link on one of the carriages, in this case, preferably on the typewriter carriage. By the arrangement shown, a wide range of adjustment is permitted and it will be noted that this wide range of adjustment is such that the movement of one carriage or one member responsive to the other will always bear the same relation independent of their relative positions in their travel. In other words the relation is the same at either end of the typewriter carriage travel as at the central position.

Experience shows that it is important to have the two links of equal length because under some circumstances at least especially if there is a wide difference between the length of the two lever arms on opposed sides of the fulcrum, difficulties will arise in connection with the angularity of the connecting rod with respect to the line of travel of the two carriages which will be accentuated unless the links are of equal length.

I claim:

1. A driving member, a driven member, a lever interposed between them and pivoted at a point removed from them, links interposed between each member and the end of the lever adjacent thereto, means for adjusting the pivot point of the link on one of the members in one direction parallel with its line of movement, means for changing the lengths of the two arms of the lever and means for shifting the pivot point of the lever along a line inclined to the lines of movement of the members.

2. A driving member, a driven member, a lever interposed between them and pivoted at a point removed from them, links interposed between each member and the end of the lever adjacent thereto, means for adjusting the pivot point of the link on one of the members in one direction parallel with its line of movement, means for changing the lengths of the two arms of the lever and means for shifting the pivot point of the lever along a line inclined to the line of movement of the members, the means for shifting the pivot point of the lever comprising a fulcrum block having a plurality of threaded holes arranged along its axis which is along a line inclined to the lines of movement of the members.

3. The combination with a typewriter having a movable carriage of a separate carriage adapted to move along a line parallel therewith, a driving connection between them comprising a lever, a link between one end of the lever and the typewriter carriage and a second link between the other end of the lever and the movable carriage, said links being normally inclined to the lines of movement of said carriages, a fulcrum pad intermediate the carriages upon which the link is pivotally mounted, the pad being inclined to the horizontal and to the lines of movement of the carriages.

4. The combination with a typewriter having a movable carriage of a separate carriage adapted to move along a line parallel with the line of movement of the typewriter carriage, a driving connection between them comprising a lever, a link between one end of the lever and the typewriter carriage and a second link between the other end of the lever and the movable carriage, said links being normally inclined to the lines of movement of said carriages, a fulcrum pad intermediate the carriages upon which the link is pivotally mounted, the pad being inclined to the horizontal and to the lines of movement of the carriages, the pad and lever being provided with a series of apertures extending along the axis of each, a pivot pin adapted selectively to engage any pair of said apertures.

5. In combination, a typewriter having a reciprocable platen carriage, a pattern selecting mechanism having a reciprocable selector carriage, parallel tracks along which said carriages are adapted to travel, means responsive to the movement of the typewriter carriage in one direction for moving the selector carriage in the opposite direction, comprising a movement transmitting member mounted for rotation about a normally fixed pivot, a separate driving connection between the movement transmitting member and each carriage, said driving connections being adapted to compensate for the varying angular relation of the transmitting member and said carriage tracks during the angular movement of the transmitting member about its fixed pivot and the rectilinear parallel movement of the two reciprocable carriages along their respective tracks, and means for adjusting the radii through which the movement transmitting member acts upon the two carriages whereby the distance of travel of the selector carriage in response to a unit travel of the typewriter carriage may be adjusted.

6. In combination, a typewriter having a reciprocable platen carriage, a pattern selecting mechanism having a reciprocable selector carriage, parallel tracks along which said carriages are adapted to travel, means responsive to the movement of the typewriter carriage in one direction for moving the selector carriage in the opposite direction, comprising a movement transmitting member mounted for rotation about a normally fixed pivot, a separate driving link between the movement transmitting member and each carriage, said links being adapted to compensate for the varying angular relation of the transmitting member and said carriage tracks during the angular movement of the transmitting member about its fixed pivot and the rectilinear parallel movement of the two reciprocable carriages along their respective tracks, and means for adjusting the radii through which the movement transmitting member acts upon the two carriages whereby the distance of travel of the selector carriage in response to a unit travel of the typewriter carriage may be adjusted.

7. In combination, a typewriter having a reciprocable platen carriage, a pattern selecting mechanism having a reciprocable selector carriage, parallel tracks along which said carriages are adapted to travel, means responsive to the movement of the typewriter carriage in one direction for moving the selector carriage in the opposite direction, comprising a movement transmitting member mounted for rotation about a normally fixed pivot, a separate driving connection between the movement transmitting member and each carriage, said driving connections being adapted to compensate for the varying angular relation of the transmitting member and said carriage tracks during the angular movement of the transmitting member about its fixed pivot and the rectilinear parallel movement of the two reciprocable carriages along their respective tracks.

8. In combination, a typewriter having a reciprocable platen carriage, a pattern selecting mechanism having a reciprocable selector carriage, parallel tracks along which said carriages are adapted to travel, means responsive to the movement of the typewriter carriage in one direction for moving the selector carriage in the opposite direction, comprising a movement transmitting member mounted for rotation about a normally fixed pivot, a separate driving link between the movement transmitting member and each carriage, said links being adapted to compensate for the varying angular relation of the transmitting member and said carriage tracks during the angular movement of the transmitting member about its fixed pivot and the rectilinear parallel movement of the two reciprocable carriages along their respective tracks.

9. In combination, a typewriter having a reciprocable carriage, a pattern selecting mechanism having a reciprocable selector carriage, parallel tracks along which said carriages are adapted to travel, and adjustable means responsive to the movement of the typewriter carriage permitting movement of the selector carriage in a direction opposite to the direction of movement of the typewriter carriage, distances different than the distance traveled by the typewriter carriage.

10. In combination, a typewriter having a reciprocable platen carriage, a pattern selecting mechanism having a reciprocable selector carriage, parallel tracks along which said carriages are adapted to travel, means responsive to the movement of the typewriter carriage in one direction for moving the selector carriage in the opposite direction, comprising a movement transmitting member mounted for rotation about a normally fixed but adjustable pivot, a separate driving connection between the movement transmitting member and each carriage, said driving connections being adapted to compensate for changes in angular relationship between said movement transmitting member and the tracks of the reciprocable carriages.

11. In combination, a typewriter having a reciprocable carriage, a pattern selecting mechanism having a reciprocable selector carriage, parallel tracks along which said carriages are adapted to travel, and means responsive to the movement of the typewriter carriage in one direction, for moving the selector carriage in the opposite direction a distance different than the corresponding distance traveled by the typewriter carriage, including a lever pivoted adjacent said tracks, a linkage connecting one end of said lever with one carriage, and a linkage connecting the opposite end of said lever with the other carriage, said lever having arms of different effective lengths.

CHESTER A. MACOMIC.